US007815726B2

(12) United States Patent
Satsu et al.

(10) Patent No.: US 7,815,726 B2
(45) Date of Patent: Oct. 19, 2010

(54) TREATING AGENT FOR FORMING A FLUORIDE COATING FILM AND METHOD FOR FORMING A FLUORIDE COATING FILM

(75) Inventors: Yuichi Satsu, Hitachi (JP); Matahiro Komuro, Hitachi (JP); Yoshii Morishita, Tsukuba (JP); Shigeaki Funyu, Tsuchiura (JP); Mitsuo Katayose, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 468 days.

(21) Appl. No.: 11/862,334

(22) Filed: Sep. 27, 2007

(65) Prior Publication Data

US 2008/0092994 A1 Apr. 24, 2008

(30) Foreign Application Priority Data

Sep. 29, 2006 (JP) ............................ 2006-266253

(51) Int. Cl.
*C09D 1/00* (2006.01)
*C01F 17/00* (2006.01)

(52) U.S. Cl. .................. 106/287.18; 423/21.1; 423/263

(58) Field of Classification Search ............ 106/287.18; 423/21.1, 263
See application file for complete search history.

(56) References Cited

U.S. PATENT DOCUMENTS

| | | | | |
|---|---|---|---|---|
| 3,475,192 | A | 10/1969 | Langley | |
| 3,615,169 | A * | 10/1971 | Thom | 423/263 |
| 5,599,588 | A * | 2/1997 | Poncelet | 427/343 |
| 7,517,564 | B2 * | 4/2009 | Crawford et al. | 427/558 |
| 2006/0022175 | A1 | 2/2006 | Komuro | |
| 2006/0191601 | A1 | 8/2006 | Komuro et al. | |
| 2008/0002259 | A1 | 1/2008 | Ishizawa et al. | |
| 2008/0241368 | A1 * | 10/2008 | Komuro et al. | 427/127 |

FOREIGN PATENT DOCUMENTS

| | | |
|---|---|---|
| JP | 7-69621 | 3/1995 |
| JP | 2006-066870 | 3/2006 |
| JP | 2006-238604 | 9/2006 |
| WO | WO 2006/030848 | 3/2006 |
| WO | WO 2006/043348 A1 | 4/2006 |

OTHER PUBLICATIONS

Chinese Office Action of Appl. No. 200710161378 with translation dated Dec. 11, 2009.

* cited by examiner

*Primary Examiner*—David M Brunsman
(74) *Attorney, Agent, or Firm*—Antonelli, Terry, Stout & Kraus, LLP.

(57) ABSTRACT

A fluoride coating film formed with a fluoride-containing solution wherein a rare earth fluoride or an alkaline earth metal fluoride, in particular, fluoride of Pr, Nd, Dy, Tb and Ho, is swollen in a solvent comprising a major amount of an alcohol, and the solution is a colloidal solution in which the rare earth fluoride or the alkaline earth metal fluoride is dispersed homogeneously in the solvent comprising a major amount of an alcohol improves magnetic properties of NdFeB rare earth magnets including not only sintered magnets but also bonded magnets.

8 Claims, No Drawings

TREATING AGENT FOR FORMING A FLUORIDE COATING FILM AND METHOD FOR FORMING A FLUORIDE COATING FILM

INCORPORATION BY REFERENCE

The present application claims priority from Japanese application JP2006-266253 filed on Sep. 29, 2006, the content of which is hereby incorporated by reference into this application.

BACKGROUND OF THE INVENTION

1. Field of the Invention

The present invention relates to a treating agent for forming a fluoride coating film and a method for forming a fluoride coating film.

2. Description of Related Art

NdFeB rare earth sintered magnets are excellent in magnetic properties, and thus used as large magnets represented by motors for automobiles and high-performance magnets such as thin magnets represented by spindle motors. The NdFeB rare earth magnets are expected for wider applications in the future. However, there are requests to further improve the performance of the magnets. As for the magnets represented by motors for automobiles which are used in high temperature atmospheres and are required to be reliable, demanded are not only improved heat resistance, namely no degradation of magnetic properties in high temperatures, but also an increased coercive force. On the other hand, the thin magnets have a problem of degradation of magnetic properties caused by damaged surface layers generated during processing magnets into thin magnets. The thinner a magnet is, the worse the degradation of magnetic properties is (WO2006/043348).

An approach to deal with the problem is under review which intends to improve magnetic properties of a damaged layer and magnetic properties of a magnet by subjecting a magnetic article to a surface treatment.

On the other hand, in order to improve magnetic properties of rare earth magnets, an approach is under review in which material magnetic particles, which is a preform of a magnetic article, is subjected to a surface treatment using a fluorine compound (JP 2006-66870 A).

In order to improve magnetic properties of NdFeB rare earth sintered magnets, it is stated that a surface treatment is effective using a Dy compound and a Tb compound, in particular a Dy fluoride and a Tb fluoride (WO2006/043348). According to the conventional techniques described in WO2006/043348, a fluorine compound constitutes a granular grain boundary phase and is not arranged along the grain boundary or the powder surface of a magnet. In order to diffuse a surface treating agent component into a magnet for the purpose of improving magnetic properties of the magnet with the surface treating agent, a magnet component is required to be partially liquefied because the magnet comes into contact with the surface treating agent in points. Furthermore, because the Dy compound and the Tb compound are thermally stable, a magnet subjected to the surface treatment is required to be subjected to a heat treatment (absorption treatment) at 800° C. or higher for 1 hour or more to improve magnetic properties of the magnet. Therefore, in order to improve magnetic properties of NdFeB rare earth sintered magnets, an ageing treatment is required, and thus two heat treatments are required. The distance of the diffusion into magnets of a Dy compound and a Tb compound in the absorption treatment is limited to several millimeters. Therefore, it is difficult to improve magnetic properties but for thin magnets.

On the other hand, it is considered effective to omit the absorption treatment, or to apply a Dy compound and a Tb compound to magnetic particles for improving magnetic properties of not thin, large magnets. However, when the difference between the average particle diameter of magnetic particles and the average particle diameter of a Dy fluoride and a Tb fluoride are within two digits, additional amounts of the Dy fluoride and the Tb fluoride become nonnegligible in relation to the volume fraction of the Dy fluoride and the Tb fluoride based on the magnetic particles. A Dy fluoride and a Tb fluoride are non magnetic. Therefore, addition of large amounts of a Dy fluoride and a Tb fluoride in subjecting magnetic particles to a surface treatment increases the coercive force of the treated magnet but invites decrease of magnetic flux density, thus not resulting in improvement of magnetic properties.

The present inventors have investigated and found that for the purpose of improving magnetic properties of NdFeB rare earth magnets including not only sintered magnets but also bonded magnets, it is effective to stack layers containing a rare earth fluoride or an alkaline earth metal fluoride, in particular, a fluoride of Pr, Nd, Dy, Tb or Ho with proper layer thicknesses on the surfaces of material magnetic particles or the surface of a thin magnet.

An object of the present invention is to provide a treating agent for forming a fluoride coating film containing a rare earth fluoride or an alkaline earth metal fluoride, in particular, a fluoride of Pr, Nd, Dy, Tb or Ho, that improves magnetic properties of NdFeB rare earth magnets including not only sintered magnets but also bonded magnets; and a method for manufacturing the treating agent for forming a fluoride coating film.

BRIEF SUMMARY OF THE INVENTION

A feature of the present invention is: a treating agent for forming a fluoride coating film, wherein a rare earth fluoride or an alkaline earth metal fluoride is swollen in a solvent comprising a major amount of an alcohol to be a colloidal solution, the rare earth fluoride or the alkaline earth metal fluoride is dispersed in the solvent comprising a major amount of an alcohol, the rare earth fluoride or the alkaline earth metal fluoride is not a powder and thus the treating agent has high transparency, whereby the treating agent containing the rare earth fluoride or the alkaline earth metal fluoride in a colloidal state in a concentration of 1 $g/dm^3$ exhibits a transmittance not less than 50% in an optical path length of 1 cm at a wavelength of 700 nm. It is more preferable that the treating agent containing the rare earth fluoride or the alkaline earth metal fluoride in a colloidal state in a concentration of 2 $g/dm^3$ exhibits a transmittance not less than 50% in the same conditions.

The treating agent for forming a fluoride coating film according to the present invention is transparent, that is, the treating agent hardly has a particle with a size of 1 μm or larger. The treating agent exhibits an extremely high wettability on the surfaces of magnets because a solvent comprising an alcohol is used. As a result, the treating agent easily permeates pits and projections with sizes not more than 1 μm generated on the surface of a magnet during processing of the magnet. It is possible to fill the pits and projections with the treating agent by an impregnation treatment.

A fluoride coating film formed on the surface of a magnet with the treating agent for forming a fluoride coating film according to the present invention is formed by a sol-gel reaction of a rare earth fluoride colloid or an alkaline earth metal fluoride colloid. As a result, the coating film is mostly amorphous and not chemically stable in comparison with crystals. In addition, the surface of a magnet comes into contact with the fluoride coating film in a plane. Therefore, diffusion of a rare earth fluoride or an alkaline earth metal fluoride into magnets occurs in 500° C. or higher. Thus, it is not necessary to conduct a heat treatment with temperatures higher than 900° C. This is a second feature of the present invention.

A third feature is that the thickness of a fluoride coating film is easily controlled because a surface treatment is conducted by using the treating agent containing a colloidal solution and not containing a powder to improve magnetic properties of magnets.

The thickness of a fluoride coating film can be controlled on the order of nanometers by controlling the concentration of the colloidal solution and the amount of the treating agent. Therefore, even when fluoride coating films are formed on the surfaces of material magnetic particles for a magnet, and then the magnet is prepared by using the magnetic particles on the surfaces of which the fluoride coating films are formed, the problem of decrease of magnetic flux density does not occur in the magnet, which is a final product, because the film thickness is smaller than the average particle diameter of the material magnetic particles by at least two digits. This is a fourth feature of the present invention.

Conventional methods do not describe the invention of stacking layers containing a rare earth fluoride or an alkaline earth metal fluoride on the surfaces of magnets or magnetic particles by using a colloidal solution for the purpose of improving magnetic properties of the magnets.

The other features of the present invention are described in the following section of detailed description of the invention.

According to the treating agent for forming a fluoride coating film and the treatment method with a fluoride coating film of the present invention, it is possible to stack layers containing a rare earth fluoride or an alkaline earth metal fluoride with proper film thicknesses on the surfaces of magnets or material magnetic particles. By subjecting the magnets or material magnetic particles on the surfaces of which the fluoride coating films have been formed to a heat treatment at temperatures from 500° C. to 900° C., magnetic properties of the magnets or the material magnetic particles can be improved.

Other objects, features and advantages of the invention will become apparent from the following description of the embodiments of the invention taken in conjunction with the accompanying drawings.

DETAILED DESCRIPTION OF THE INVENTION

The present invention can increase the coercive force and the squareness in the second quadrant of a B—H loop of R—Fe—B magnets, wherein R represents a rare earth element, thereby improving an energy product. In addition, according to the present invention, a coating film with high heat resistance is formed on the surface of a magnet, thereby increasing heat resistance of the magnet. As a result, a rare earth magnet prepared by using a magnetic powder for rare earth magnets having the coating film according to the present invention can reduce degradation of magnetic properties even when exposed to varying magnetic fields such as alternating magnetic fields under environments of 100° C. or higher. Thus, the magnets can be used in rotating machineries such as surface magnet motors and embedded magnet motors.

In order to achieve the above objects, a coating film containing a metal fluoride must be continuously formed along the surface of a magnet or the surfaces of magnet particles while maintaining the magnetic properties. NdFeB magnets comprise $Nd_2Fe_{14}B$ as a principal phase and further comprise Nd phase and $Nd_{1.1}Fe_4B_4$ phase in phase diagram. By appropriately adjusting the composition of NdFeB and heating the resulting NdFeB, Nd phase or NdFe alloy phase is formed at grain boundaries. These Nd-rich phases are susceptible to oxidation, thereby yielding an oxide layer partially. The fluoride-containing layer is arranged outside of the parent phase, i.e., the Nd phase, NdFe alloy layer or Nd oxide layer. The coating film containing a fluoride comprises a phase containing at least one of alkaline earth metals and rare earth elements combined with fluorine. The fluorine-containing layer is arranged in contact with the $Nd_2Fe_{14}B$, Nd phase, NdFe phase, or Nd oxide layer. The Nd phase or NdFe phase has a lower melting point, is more susceptible to diffusion due to heating and more easily changes in structure than $Nd_2Fe_{14}B$. The layer containing a fluoride of an alkaline earth metal or a rare earth element should essentially have an average thickness greater than the thickness of the Nd phase, NdFe phase, or Nd oxide layer. The thickness enables diffusion of a rare earth fluoride or an alkaline earth metal fluoride into magnets for improving magnetic properties of the magnets with the rare earth fluoride or the alkaline earth metal fluoride, thereby achieving high magnetic properties of the magnets.

Materials to which the present invention can be applied will be described below. The fluoride-containing coating film can comprise any of fluorides including $CaF_2$, $MgF_2$, $SrF_2$, $BaF_2$, $LaF_3$, $CeF_3$, $PrF_3$, $NdF_3$, $SmF_3$, $EuF_3$, $GdF_3$, $TbF_3$, $DyF_3$, $HoF_3$, $ErF_3$, $TmF_3$, $YbF_3$, and $LuF_3$; amorphous substances having a composition of these fluorides; fluorides comprising two or more such elements that constitute these fluorides; complex fluorides wherein oxygen or nitrogen or carbon or the like is mixed with these fluorides; fluorides mixed with a constitutional element including impurities contained in the principal phase of these fluorides; and fluorides having a fluorine content lower than that of the above-mentioned fluorides. In particular, the coating film desirably contains fluorides containing Pr, Nd, Dy, Tb or Ho.

The fluoride-containing coating film can be uniformly formed effectively by applying a solution to the surface of ferromagnetic particles. In particular, it is very difficult to form a coating film on the surface of material magnetic particles with a uniform thickness by a method other than the method of applying a solution. Such magnetic particles for rare earth magnets are very susceptible to corrosion, and the metal fluoride may be formed by sputtering or vapor deposition. According to these techniques, however, it takes much time and efforts to form a metal fluoride layer having a uniform thickness, inviting higher cost. On the other hand, wet coating using an aqueous solution is not desirable, because magnetic particles for rare earth magnets easily form rare earth oxides. The present inventors have found that, by applying a solution comprising a major amount of an alcohol, a layer of metal fluoride can be formed while inhibiting the corrosion of the magnetic particles for rare earth magnets, because such an alcohol has high wettability to magnetic particles for rare earth magnets and can remove ionic components as much as possible.

As for a form of the rare earth fluoride or the alkaline earth metal fluoride, in consideration of the object to apply it to rare earth magnets or material magnetic particles, the state is undesirable that solid particles of the rare earth fluoride or the alkaline earth metal fluoride are suspended. This is because application of the rare earth fluoride or the alkaline earth metal fluoride in the state of solid particles to rare earth magnets or material magnetic particles cannot form a stack of coating films of the rare earth fluoride or the alkaline earth metal fluoride. The present inventors focused attention on a sol-gel reaction occurred when hydrofluoric acid is added to an aqueous solution containing rare earth or alkaline earth metal ions and has found that such ionic components can be removed while replacing water as a solvent with an alcohol. The inventors have also found that a rare earth fluoride or an alkaline earth metal fluoride in the gel state can be processed into an almost transparent colloidal solution by concurrently carrying out ultrasonic stirring, and that the resulting treating agent is optimum for forming a uniform film of the rare earth fluoride or the alkaline earth metal fluoride on rare earth magnets or material magnetic particles.

In preparation of an almost transparent colloidal solution of a rare earth fluoride or an alkaline earth metal fluoride, a rare earth salt or an alkaline earth metal salt with high solubility in water is easily handled as a material. As for a salt concentration in an aqueous solution immediately before the fluoride is prepared, 90% or less of the solubility of the salt and not less than 10 $g/dm^3$ are preferable. This is because use of an aqueous solution with a concentration of not less than 90% of the solubility of the salt tends to generate an oxide or a hydroxide of a rare earth or an alkaline earth metal as a by-product on addition of hydrofluoric acid. In addition, use of an aqueous solution with a concentration of less than 10 $g/dm^3$ involves a concentration step because the concentration of a rare earth fluoride or an alkaline earth metal fluoride is low. Next, the concentration of hydrofluoric acid to be added for forming the rare earth fluoride or the alkaline earth metal fluoride is preferably not more than 10% and not less than 0.5%. When the concentration of hydrofluoric acid is 10% or higher, the resulting gel of the rare earth fluoride or the alkaline earth metal fluoride tends to become ununiform, and it could be difficult to prepare a transparent colloidal solution even when ultrasonic stirring is conducted. On the other hand, when the concentration of hydrofluoric acid is 0.5% or less, the solution has a low concentration of the rare earth fluoride or the alkaline earth metal fluoride, and which requires an additional concentration step. The additional amount of hydrofluoric acid to a rare earth or an alkaline earth metal is preferably 60 to 150% of reaction equivalent, desirably 80 to 120%, and more desirably 90 to 110%. This is because it is difficult to wash out fluoride ions as described later when the additional amount of hydrofluoric acid to a rare earth or an alkaline earth metal is more than 100%. On the other hand, when the additional amount of hydrofluoric acid to a rare earth or an alkaline earth metal is less than 100%, 100% of a rare earth fluoride or an alkaline earth metal fluoride is not generated, and further an oxygen-containing compound is generated. Use of a treating agent of an almost transparent colloidal solution of a rare earth fluoride or an alkaline earth metal fluoride containing the oxygen-containing compound for forming a coating film on the surface of magnets or material magnet particles results in degradation of magnetic properties of the magnets or the material magnet particles upon being subjected to a heat treatment. After hydrofluoric acid is added to a rare earth or an alkaline earth metal, it is necessary to remove anions and fluoride ions in a rare earth salt or an alkaline earth metal salt by washing with an alcohol. This is because the presence of the ions in the treating agent causes the surfaces of magnets or material magnetic particles to be susceptible to corrosion during forming of a coating film on the surfaces of magnets or material magnetic particles.

Preferred solvents for forming an almost transparent colloidal solution of a rare earth fluoride or an alkaline earth metal fluoride are alcohols or water-soluble solvents having a ketone group that have five or less carbon atoms and have boiling points about 100° C. or below that. Specific examples of the solvents for forming an almost transparent colloidal solution of a rare earth fluoride or an alkaline earth metal fluoride may include methyl alcohol, ethyl alcohol, n-propyl alcohol, isopropyl alcohol, n-butylpropyl alcohol, isobutyl alcohol, acetone, 2-butanone, 2-pentanone, and 3-pentanone. Desirably, the solvents may include methyl alcohol, ethyl alcohol, n-propyl alcohol, isopropyl alcohol, acetone, and 2-butanone. The solvents may also be used in combination for forming an almost transparent colloidal solution of a rare earth fluoride or an alkaline earth metal fluoride.

A coating film containing a rare earth fluoride or an alkaline earth metal fluoride can be formed in either process before or after a heat treatment for yielding high coercive force. After the surfaces of rare earth magnets or material magnetic particles are covered with the fluoride-containing coating films, in the case of the material magnetic particles being for anisotropic rare earth magnets, the magnetic particles are subjected to magnetic-field orientation, heating and molding to provide magnets. Isotropic magnets can also be produced without applying magnetic fields for imparting anisotropy. Alternatively, bonded magnets can be prepared by heating the magnetic particles for rare earth magnets covered with the fluoride-containing coating film at temperatures of 1200° C. or lower to impart high coercive force, and mixing the particles with organic materials to provide a compound. Ferromagnetic materials comprising rare earth elements can be powders comprising any of $Nd_2Fe_{14}B$, $(Nd, Dy)_2Fe_{14}B$, $Nd_2(Fe, Co)_{14}B$, and $(Nd, Dy)_2(Fe, Co)_{14}B$; and these NdFeB substances further combined with Ga, Mo, V, Cu, Zr, Tb and/or Pr. The rare earth fluoride or the alkaline earth metal fluoride in the treating agent for forming a coating film is swollen in a solvent comprising a major amount of an alcohol. This is because the present inventors have found that a gel of the rare earth fluoride or the alkaline earth metal fluoride has a flexible gelatinous structure, the gel is easily processed into the colloid state by ultrasonic dispersion, and that alcohols have high wettability to magnetic particles for rare earth magnets. The rare earth fluoride or the alkaline earth metal fluoride in the colloid state has an average particle diameter of submicrometer and thus coating films formed on the surfaces of rare earth magnets or material magnetic particles tend to have uniform film thicknesses. Additionally, use of a solvent comprising a major amount of an alcohol can inhibit oxidation of rare earth magnets or material magnetic particles that are very susceptible to oxidation.

A concentration of the rare earth fluoride or alkaline earth metal fluoride varies depending on the thickness of a film to be formed on the surfaces of magnetic particles for rare earth magnets, but the concentration has an upper limit so that the rare earth fluoride or the alkaline earth metal fluoride is swollen in a solvent comprising a major amount of an alcohol, the rare earth fluoride or the alkaline earth metal fluoride in the colloid state has an average particle diameter of submicrometer or less, and dispersed in the solvent. While the upper limit of the concentration will be described later, a colloidal treating agent in which the rare earth fluoride or alkaline earth metal fluoride is swollen and dispersed in a solvent comprising a major amount of an alcohol preferably has a concentration of 300 $g/dm^3$ to 1 $g/dm^3$.

When a treating agent for forming a rare earth fluoride coating film or an alkaline earth metal fluoride coating film has a concentration not less than 200 $g/dm^3$, the treating agent gelatinizes after being left within a day at room temperature. The gelatinization concentration of a treating agent for forming a rare earth fluoride coating film or an alkaline earth metal fluoride coating film varies depending on the type of the fluoride. The phenomenon does not occur by suspending a powder of a rare earth fluoride or an alkaline earth metal fluoride in a solution. The present inventors have found that the phenomenon occurs by preparing the rare earth fluoride or the alkaline earth metal fluoride to be swollen in the solvent, as disclosed in the present invention. Therefore, the treating agent according to the present invention is excellent in homogeneity and stability of the agent, which is different from the suspension. In addition, the treating agent contains extremely small amounts of ionic components, and thus the treating agent for forming a rare earth fluoride coating film or an alkaline earth metal fluoride coating film does not cause corrosion in magnetic particles for rare earth magnets which are susceptible to corrosion. On the other hand, on forming the coating film on the surface of a magnet, the concentration of the rare earth fluoride or the alkaline earth metal fluoride is preferably high. A gelatinized treating agent for forming a rare earth fluoride coating film or an alkaline earth metal fluoride coating film can be processed into a colloidal solution by an ultrasonic dispersion treatment when the concentration is not more than 300 $g/dm^3$. Thus the treating agent with a concentration not more than 300 $g/dm^3$ is usable as a treating agent. However, a treating agent for forming a rare earth fluoride coating film or an alkaline earth metal fluoride coating film with a concentration not less than 300 $g/dm^3$ is difficult to be used as a treating agent for surface treatments because such a treating agent has a high viscosity even when the agent is subjected to an ultrasonic dispersion treatment. This is one of only a few detriments that the treating agent according to the present invention has.

When a coating film is formed on a magnetic article, the upper limit of the thickness of the coating film is 5% or less, and preferably 2% or less based on the thickness of the magnetic article because the amounts of metallic elements in the coating film influences magnetic properties of the magnetic article. On the other hand, as to the lower limit of the thickness of the coating film, at least 1 nm or more is necessary, and preferably 10 nm or more because it is necessary to improve a damaged layer in the surface of magnet article.

In the case of forming a rare earth fluoride coating film or an alkaline earth metal fluoride coating film on the surface of magnetic particles for rare earth magnets, an additional amount of a treating agent for forming a rare earth fluoride coating film or an alkaline earth metal fluoride coating film varies depending on the average particle diameter of the magnetic particles for rare earth magnets. When the magnetic particles for rare earth magnets have an average particle diameter of 0.1 to 500 μm, the amount of the treating agent ranges preferably from 300 ml to 10 ml per 1 kg of the material magnetic particles for rare earth magnets. This is because use of a large amount of the treating agent requires long time to remove the solvent, and further the material magnetic particles tends to be susceptible to corrosion due to water or the like contained in the solution in small amounts. On the other hand, if the amount is excessively small, the material magnetic particles for rare earth magnets are not partially wetted on their surfaces with the treating agent.

As for the rare earth magnets, any rare earth-containing materials such as Nd—Fe—B materials can be used.

The present invention will be described in further detail with reference to several Examples.

EXAMPLE 1

Treating agents for forming a rare earth fluoride coating film or an alkaline earth metal fluoride coating film were prepared in the following manner. As an example, preparation of a treating agent containing $DyF_3$ is described.

4 g of Dy acetate or Dy nitrate was dissolved in 100 mL of water. After that, 90% the amount necessary for generating $DyF_3$ of hydrofluoric acid was diluted to 1% and gradually added thereto while stirring to generate gelatinized $DyF_3$. The supernatant was removed by centrifuging. Then a process was repeated 3 to 10 times in which the same amount of methanol as the remaining gel was added, stirred and centrifuged, thereby removing anions. Thus an almost transparent colloidal methanol solution of $DyF_3$ was prepared (concentration: $DyF_3$/methanol=1 g/5 mL).

In Table 1, summarized are transmittance of other treating agents for forming a rare earth fluoride coating film or an alkaline earth metal fluoride coating film in an optical path length of 1 cm at a wavelength of 700 nm.

TABLE 1

Treating agents for forming a rare earth fluoride coating film or an alkaline earth metal fluoride coating film

| Component | Solvent | Transmittance (concentration of metal fluoride: 1 $g/dm^3$) |
|---|---|---|
| $MgF_2$ | methyl alcohol | 99% |
| $CaF_2$ | methyl alcohol | 97% |
| $LaF_3$ | methyl alcohol | 99% |
| $LaF_3$ | ethyl alcohol | 90% |
| $LaF_3$ | n-propyl alcohol | 70% |
| $LaF_3$ | iso-propyl alcohol | 50% |
| $CeF_3$ | methyl alcohol | 80% |
| $PrF_3$ | methyl alcohol | 98% |
| $NdF_3$ | methyl alcohol | 97% |
| $SmF_3$ | methyl alcohol | 70% |
| $EuF_3$ | methyl alcohol | 80% |
| $GdF_3$ | methyl alcohol | 90% |
| $TbF_3$ | methyl alcohol | 97% |
| $DyF_3$ | methyl alcohol | 95% |
| $HoF_3$ | methyl alcohol | 80% |
| $ErF_3$ | methyl alcohol | 90% |
| $TmF_3$ | methyl alcohol | 95% |
| $YbF_3$ | methyl alcohol | 80% |
| $LuF_3$ | methyl alcohol | 70% |

Next, as the magnetic particles for rare earth magnets, particles of NdFeB alloy were used. The magnetic particles have an average particle diameter of 200 μm and are magnetically anisotropic. The processes of forming a rare earth fluoride coating film or an alkaline earth metal fluoride coating film on the magnetic particles for rare earth magnets were conducted in the following manner.

In the case of processes for forming $TbF_3$ coating film: almost transparent colloidal solution having a $TbF_3$ concentration of 0.5 g/10 mL (1) To 100 g of magnetic particles for rare earth magnets having an average particle diameter of 200 μm was added 20 mL of a treating agent for forming a $TbF_3$ coating film and mixed until the whole magnetic particles for rare earth magnets were wetted.

(2) The solvent methanol was removed at a reduced pressure of 2 to 5 torr from the magnetic particles for rare earth magnets on which $TbF_3$ coating films were formed in the process (1).

(3) The magnetic particles for rare earth magnets from which the solvent was removed in the process (2) were placed in a quartz boat and subjected to heat treatments at a reduced pressure of $1\times10^{-5}$ torr at 200° C. for thirty minutes and at 350° C. for thirty minutes.

(4) The magnetic particles treated with heat in the process (3) were placed in a Macor (manufactured by Riken Denshi Co., Ltd.) vessel with a lid and subjected to a heat treatment at 700° C. at a reduced pressure of $1\times10^{-5}$ torr for thirty minutes.

(5) The magnetic properties of the magnetic particles for rare earth magnets after heat treatment in the process (4) were determined.

(6) The magnetic particles for rare earth magnets after heat treatment in the process (4) were charged into a die, oriented in an inert gas atmosphere in a magnetic field of 10 kOe and heated, pressed and thus molded at a temperature of 700° C. and a molding pressure of 5 t/cm$^2$ to yield an anisotropic magnet 7 mm by 7 mm by 5 mm.

(7) A pulsed magnetic field of 30 kOe or more was applied to the anisotropic magnet prepared in the process (6) in the anisotropic direction. The magnetic properties of the resulting magnet were determined.

Magnets were prepared according to the processes (1) to (7) in which other rare earth fluoride coating films or alkaline earth metal fluoride coating films were formed. The magnetic properties of the magnets were determined. The results are summarized in Table 2.

TABLE 2

Magnetic properties of magnets prepared with magnetic particles on which rare earth fluoride coating films or alkaline earth metal fluoride coating films are formed

| Treating agent | Component | Additional amount of treating agent per 100 g of magnetic particles | Concentration | Solvent | Magnetic properties of magnetic particles: Residual flux density | Coercive force | Maximum energy product |
|---|---|---|---|---|---|---|---|
| 1 | — | — | — | — | 11.0 kG | 15.0 kOe | 23.2 MGOe |
| 2 | MgFa | 30 mL | 10 g/dm$^3$ | methyl alcohol | 11.2 kG | 15.5 kOe | 23.8 MGOe |
| 3 | $CaF_2$ | 3 mL | 200 g/dm$^3$ | methyl alcohol | 11.3 kG | 16.0 kOe | 24.2 MGOe |
| 4 | $LaF_3$ | 30 mL | 50 g/dm$^3$ | methyl alcohol | 11.4 kG | 16.5 kOe | 24.8 MGOe |
| 5 | $LaF_3$ | 20 mL | 100 g/dm$^3$ | ethyl alcohol | 11.3 kG | 16.3 kOe | 24.3 MGOe |
| 6 | $LaF_3$ | 5 mL | 200 g/dm$^3$ | n-propyl alcohol | 11.2 kG | 16.1 kOe | 23.9 MGOe |
| 7 | $LaF_3$ | 2 mL | 300 g/dm$^3$ | iso-propyl alcohol | 11.0 kG | 15.9 kOe | 23.6 MGOe |
| 8 | $CeF_3$ | 30 mL | 50 g/dm$^3$ | methyl alcohol | 11.1 kG | 15.5 kOe | 23.6 MGOe |
| 9 | $PrF_3$ | 30 mL | 50 g/dm$^3$ | methyl alcohol | 11.3 kG | 16.5 kOe | 24.4 MGOe |
| 10 | $NdF_3$ | 15 mL | 100 g/dm$^3$ | methyl alcohol | 11.4 kG | 17.0 kOe | 25.0 MGOe |
| 11 | $SmF_3$ | 5 mL | 300 g/dm$^3$ | methyl alcohol | 11.1 kG | 15.5 kOe | 23.6 MGOe |
| 12 | $EuF_3$ | 5 mL | 200 g/dm$^3$ | methyl alcohol | 11.2 kG | 15.6 kOe | 23.9 MGOe |
| 13 | $GdF_3$ | 5 mL | 200 g/dm$^3$ | methyl alcohol | 11.1 kG | 15.5 kOe | 23.6 MGOe |
| 14 | $TbF_3$ | 20 mL | 50 g/dm$^3$ | methyl alcohol | 11.2 kG | 19.5 kOe | 24.2 MGOe |
| 15 | $DyF_3$ | 20 mL | 50 g/dm$^3$ | methyl alcohol | 11.3 kG | 17.5 kOe | 24.5 MGOe |
| 16 | $HoF_3$ | 10 mL | 100 g/dm$^3$ | methyl alcohol | 11.3 kG | 17.0 kOe | 24.5 MGOe |
| 17 | $ErF_3$ | 10 mL | 100 g/dm$^3$ | methyl alcohol | 11.2 kG | 15.5 kOe | 23.8 MGOe |
| 18 | $TmF_3$ | 10 mL | 100 g/dm$^3$ | methyl alcohol | 11.3 kG | 15.7 kOe | 24.7 MGOe |
| 19 | $YbF_3$ | 10 mL | 100 g/dm$^3$ | methyl alcohol | 11.4 kG | 15.6 kOe | 24.1 MGOe |
| 20 | $LuF_3$ | 10 mL | 100 g/dm$^3$ | methyl alcohol | 11.5 kG | 15.5 kOe | 24.6 MGOe |

| Treating agent | Magnetic properties and resistivity of magnets: Residual flux density | Coercive force | Maximum energy product | Resistivity |
|---|---|---|---|---|
| 1 | 9.9 kG | 15.0 kOe | 18.8 MGOe | 0.15 mΩcm |
| 2 | 10.1 kG | 15.5 kOe | 19.3 MGOe | 0.20 mΩcm |
| 3 | 10.2 kG | 16.0 kOe | 19.7 MGOe | 0.23 mΩcm |
| 4 | 10.3 kG | 16.5 kOe | 20.2 MGOe | 0.50 mΩcm |
| 5 | 10.2 kG | 16.3 kOe | 19.8 MGOe | 0.65 mΩcm |
| 6 | 10.1 kG | 16.1 kOe | 19.4 MGOe | 0.48 mΩcm |
| 7 | 9.9 kG | 15.9 kOe | 18.9 MGOe | 0.30 mΩcm |
| 8 | 10.0 kG | 15.5 kOe | 19.1 MGOe | 0.48 mΩcm |
| 9 | 10.2 kG | 16.5 kOe | 19.8 MGOe | 0.51 mΩcm |
| 10 | 10.3 kG | 17.0 kOe | 20.3 MGOe | 0.53 mΩcm |
| 11 | 10.0 kG | 15.5 kOe | 19.1 MGOe | 0.40 mΩcm |
| 12 | 10.1 kG | 15.6 kOe | 19.3 MGOe | 0.43 mΩcm |
| 13 | 10.0 kG | 15.5 kOe | 19.1 MGOe | 0.45 mΩcm |
| 14 | 10.1 kG | 19.5 kOe | 19.7 MGOe | 0.42 mΩcm |
| 15 | 10.2 kG | 17.5 kOe | 20.1 MGOe | 0.44 mΩcm |
| 16 | 10.2 kG | 17.0 kOe | 19.9 MGOe | 0.47 mΩcm |
| 17 | 10.1 kG | 15.5 kOe | 19.3 MGOe | 0.46 mΩcm |
| 18 | 10.2 kG | 15.7 kOe | 19.5 MGOe | 0.45 mΩcm |
| 19 | 10.3 kG | 15.6 kOe | 20.0 MGOe | 0.41 mΩcm |
| 20 | 10.4 kG | 15.5 kOe | 20.1 MGOe | 0.38 mΩcm |

These results show that the magnetic particles on which various rare earth fluoride coating films or alkaline earth metal fluoride coating films are formed, and the anisotropic rare earth magnets prepared with the magnetic particles have more excellent magnetic properties and higher resistivity than the magnetic particles without the coating films and the anisotropic rare earth magnet prepared with these magnetic particles. In particular, the magnetic particles having a $TbF_3$ coating film and a $DyF_3$ coating film and the anisotropic rare earth magnets prepared with the magnetic particles have significantly improved magnetic properties.

EXAMPLE 2

As treating agents for forming a rare earth fluoride coating film or an alkaline earth metal fluoride coating film, the agents prepared in Example 1 were used. In this Example, a sintered body having $Nd_2Fe_{14}B$ in the principal phase after being polished was used.

The processes of forming a rare earth fluoride coating film or an alkaline earth metal fluoride coating film on the surface of the magnetic sintered body were conducted in the following manner.

In the case of processes for forming $DyF_3$ coating film: almost transparent colloidal solution having a $DyF_3$ concentration of 1 g/10 mL (1) A magnetic sintered body with a size of 6 mm by 6 mm by 5 mm was immersed in an almost transparent colloidal solution having a $DyF_3$ concentration of 1 g/10 mL which was immediately after being subjected to an ultrasonic treatment.

(2) The solvent methanol was removed at a reduced pressure of 2 to 5 torr from the magnetic sintered body to the surface of which the $DyF_3$ treating agent was applied in the process (1).

(3) The processes (1) and (2) were repeated 1 to 10 times as needed.

(4) The magnetic sintered body from which the solvent was removed in the process (3) was placed in a quartz boat and subjected to heat treatments at a reduced pressure of $1\times10^{-5}$ torr at 200° C. for thirty minutes and at 400° C. for thirty minutes.

(5) The magnetic sintered body treated with heat in the process (4) was placed in a Macor (manufactured by Riken Denshi Co., Ltd.) vessel with a lid and at a reduced pressure of $1\times10^{-5}$ torr subjected to a heat treatment with conditions combining any one of 600° C., 700° C., 800° C., and 900° C. and any one of 1 hour, 2 hours and 3 hours.

(6) A pulsed magnetic field of 30 kOe or more was applied to the magnetic sintered body prepared in the process (5). The magnetic properties of the resulting magnet were determined.

Magnets were prepared according to the processes (1) to (6) in which other rare earth fluoride coating films or alkaline earth metal fluoride coating films were formed. The magnetic properties of the magnets were determined. The results are summarized in Table 3.

TABLE 3

Magnetic properties of magnets prepared with magnetic particles on which rare earth fluoride coating films or alkaline earth metal fluoride coating films are formed

| Treating agent | Component | Film thickness of metal fluoride | Number of application | Thickness of magnet (mm) | Concentration | Solvent |
|---|---|---|---|---|---|---|
| 1 | — | — | — | 10 | — | — |
| 2 | $PrF_3$ | 0.1 μm | 1 | 1 | 5 g/dm$^3$ | methyl alcohol |
| 3 | $NdF_3$ | 1 μm | 1 | 3 | 20 g/dm$^3$ | methyl alcohol |
| 4 | $TbF_3$ | 10 μm | 2 | 10 | 50 g/dm$^3$ | methyl alcohol |
| 5 | $DyF_3$ | 10 μm | 1 | 8 | 100 g/dm$^3$ | methyl alcohol |
| 6 | $HoF_3$ | 100 μm | 10 | 5 | 100 g/dm$^3$ | methyl alcohol |

| Treating agent | Heat treatment conditions | | Magnetic properties and resistivity of magnets | | |
|---|---|---|---|---|---|
| | Temperature | Time | Residual flux density | Coercive force | Maximum energy product |
| 1 | 800° C. | 2 h | 12.5 kG | 21.3 kOe | 37.3 MGOe |
| 2 | 600° C. | 2 h | 12.5 kG | 24.2 kOe | 37.8 MGOe |
| 3 | 700° C. | 1 h | 12.5 kG | 23.8 kOe | 37.5 MGOe |
| 4 | 800° C. | 3 h | 12.5 kG | 29.5 kOe | 37.6 MGOe |
| 5 | 800° C. | 2 h | 12.5 kG | 26.5 kOe | 37.5 MGOe |
| 6 | 900° C. | 2 h | 12.5 kG | 24.0 kOe | 37.4 MGOe |

Consultation about magnetic properties in ref under each heat treatment condition These results show that the sintered magnets on which various rare earth fluoride coating films or alkaline earth metal fluoride coating films are formed have improved magnetic properties as compared with a sintered magnet without the coating films. On the other hand, other sintered magnets on which rare earth fluoride coating films or alkaline earth metal fluoride coating films are formed have larger maximum energy products in magnetic properties than the sintered magnet without the coating films.

EXAMPLE 3

As treating agents for forming a rare earth fluoride coating film or an alkaline earth metal fluoride coating film, the agents prepared in Example 1 were used. In this Example, the magnetic particles for rare earth magnets were prepared by quenching parent alloys having adjusted compositions to yield NdFeB amorphous ribbons and pulverizing the amorphous ribbons. Specifically, the parent alloys were melted on a rotating roll such as a single roll or twin roll and were quenched by spraying an inert gas such as argon gas. The atmosphere can be inert gas atmosphere, reducing atmosphere, or vacuum atmosphere. The resulting quenched ribbons are amorphous or mixtures of an amorphous substance and a crystalline substance. The ribbons were pulverized and classified so as to have an average particle diameter of 300 μm. The magnetic particles comprising amorphous substances became crystalline as a result of heating thereby providing isotropic magnetic particles having a $Nd_2Fe_{14}B$ phase as a principal phase.

The processes of forming a rare earth fluoride coating film or an alkaline earth metal fluoride coating film on magnetic particles for rare earth magnets were conducted in the following manner.

In the case of processes for forming $PrF_3$ coating film: almost transparent colloidal solution having a $PrF_3$ concentration of 0.5 g/10 mL (1) To 100 g of the magnetic particles for rare earth magnets having an average particle diameter of 300 μm was added 30 mL of the treating agent for forming a $PrF_3$ coating film and mixed until the whole magnetic particles for rare earth magnets were wetted.

(2) The solvent methanol was removed at a reduced pressure of 2 to 5 torr from the magnetic particles for rare earth magnets on which $PrF_3$ coating films were formed in the process (1).

(3) The magnetic particles for rare earth magnets from which the solvent was removed in the process (2) were placed in a quartz boat and subjected to heat treatments at a reduced pressure of $1\times10^{-5}$ torr at 200° C. for thirty minutes and at 400° C. for thirty minutes.

(4) The magnetic particles treated with heat in the process (3) were placed in a Macor (manufactured by Riken Denshi Co., Ltd.) vessel with a lid and subjected to a heat treatment at 700° C. at a reduced pressure of $1\times10^{-5}$ torr for thirty minutes.

(5) The magnetic properties of the magnetic particles for rare earth magnets heat treated in the process (4) were determined.

(6) The magnetic particles heat treated in the process (4) were mixed with 10% by volume of a solid epoxy resin (EPX 6136 from Somar Corporation) having a size of 100 μm or less using a V mixer.

(7) The compound of the magnetic particles for rare earth magnets and the resin prepared in the process (6) was charged into a die, oriented in an inert gas atmosphere in a magnetic field of 10 kOe and heated, pressed and thus molded at a temperature of 70° C. and a molding pressure of 5 t/cm$^2$ to yield a bonded magnet 7 mm by 7 mm by 5 mm.

(8) The resin in the bonded magnet prepared in the process (7) was cured at 170° C. in nitrogen gas for one hour.

(9) A pulsed magnetic field of 30 kOe or more was applied to the bonded magnet prepared in the process (8). The magnetic properties of the resulting magnet were determined.

Magnets were prepared according to the processes (1) to (9) in which other rare earth fluoride coating films or alkaline earth metal fluoride coating films were formed. The magnetic properties of the magnets were determined. The results are summarized in Table 4.

TABLE 4

Magnetic properties of magnets prepared with magnetic particles on which rare earth fluoride coating films or alkaline earth metal fluoride coating films are formed

| Treating agent | Component | Amount of treating agent per 100 g of magnetic particles | Concentration | Solvent | Magnetic properties of magnetic particles: Residual flux density | Coercive force | Maximum energy product |
|---|---|---|---|---|---|---|---|
| 1 | — | — | — | — | 6.5 kG | 12.0 kOe | 10.5 MGOe |
| 2 | $MgF_2$ | 30 mL | 10 g/dm$^3$ | methyl alcohol | 6.6 kG | 12.6 kOe | 10.8 MGOe |
| 3 | $CaF_2$ | 3 mL | 200 g/dm$^3$ | methyl alcohol | 6.5 kG | 12.8 kOe | 10.6 MGOe |
| 4 | $LaF_3$ | 30 mL | 50 g/dm$^3$ | methyl alcohol | 6.8 kG | 14.4 kOe | 11.2 MGOe |
| 5 | $LaF_3$ | 20 mL | 100 g/dm$^3$ | ethyl alcohol | 6.8 kG | 14.1 kOe | 11.1 MGOe |
| 6 | $LaF_3$ | 5 mL | 200 g/dm$^3$ | n-propyl alcohol | 6.9 kG | 13.8 kOe | 11.6 MGOe |
| 7 | $LaF_3$ | 2 mL | 300 g/dm$^3$ | iso-propyl alcohol | 6.9 kG | 13.6 kOe | 11.5 MGOe |
| 8 | $CeF_3$ | 30 mL | 50 g/dm$^3$ | methyl alcohol | 6.7 kG | 12.8 kOe | 10.7 MGOe |
| 9 | $PrF_3$ | 30 mL | 50 g/dm$^3$ | methyl alcohol | 6.8 kG | 14.5 kOe | 11.8 MGOe |
| 10 | $NdF_3$ | 15 mL | 100 g/dm$^3$ | methyl alcohol | 6.9 kG | 13.8 kOe | 11.6 MGOe |
| 11 | $SmF_3$ | 5 mL | 300 g/dm$^3$ | methyl alcohol | 6.7 kG | 13.0 kOe | 10.8 MGOe |
| 12 | $EuF_3$ | 5 mL | 200 g/dm$^3$ | methyl alcohol | 6.7 kG | 13.1 kOe | 10.8 MGOe |
| 13 | $GdF_3$ | 5 mL | 200 g/dm$^3$ | methyl alcohol | 6.8 kG | 13.3 kOe | 11.0 MGOe |
| 14 | $TbF_3$ | 20 mL | 50 g/dm$^3$ | methyl alcohol | 7.0 kG | 16.7 kOe | 12.3 MGOe |
| 15 | $DyF_3$ | 20 mL | 50 g/dm$^3$ | methyl alcohol | 7.1 kG | 15.2 kOe | 12.5 MGOe |
| 16 | $HoF_3$ | 10 mL | 100 g/dm$^3$ | methyl alcohol | 7.0 kG | 14.3 kOe | 12.0 MGOe |
| 17 | $ErF_3$ | 10 mL | 100 g/dm$^3$ | methyl alcohol | 6.9 kG | 14.2 kOe | 11.7 MGOe |

TABLE 4-continued

| Magnetic properties of magnets prepared with magnetic particles on which rare earth fluoride coating films or alkaline earth metal fluoride coating films are formed | | | | | | | |
|---|---|---|---|---|---|---|---|
| 18 | $TmF_3$ | 10 mL | 100 $g/dm^3$ | methyl alcohol | 6.8 kG | 13.8 kOe | 11.5 MGOe |
| 19 | $YbF_3$ | 10 mL | 100 $g/dm^3$ | methyl alcohol | 6.9 kG | 13.9 kOe | 11.4 MGOe |
| 20 | $LuF_3$ | 10 mL | 100 $g/dm^3$ | methyl alcohol | 6.9 kG | 13.9 kOe | 11.4 MGOe |

| | Magnetic properties and resistivity of magnets | | | |
|---|---|---|---|---|
| Treating agent | Residual flux density | Coercive force | Maximum energy product | Resistivity |
| 1 | 5.7 kG | 12.0 kOe | 8.1 MGOe | 5.6 mΩcm |
| 2 | 5.7 kG | 12.6 kOe | 8.2 MGOe | 25 mΩcm |
| 3 | 5.7 kG | 12.8 kOe | 8.3 MGOe | 30 mΩcm |
| 4 | 5.9 kG | 14.4 kOe | 8.8 MGOe | 90 mΩcm |
| 5 | 5.9 kG | 14.1 kOe | 8.9 MGOe | 70 mΩcm |
| 6 | 6.0 kG | 13.8 kOe | 9.0 MGOe | 50 mΩcm |
| 7 | 6.0 kG | 13.6 kOe | 8.9 MGOe | 40 mΩcm |
| 8 | 5.8 kG | 12.8 kOe | 8.3 MGOe | 110 mΩcm |
| 9 | 5.9 kG | 14.5 kOe | 8.8 MGOe | 90 mΩcm |
| 10 | 6.0 kG | 13.8 kOe | 9.0 MGOe | 120 mΩcm |
| 11 | 5.8 kG | 13.0 kOe | 8.4 MGOe | 45 mΩcm |
| 12 | 5.8 kG | 13.1 kOe | 8.4 MGOe | 40 mΩcm |
| 13 | 5.9 kG | 13.3 kOe | 8.6 MGOe | 40 mΩcm |
| 14 | 6.0 kG | 16.7 kOe | 9.4 MGOe | 35 mΩcm |
| 15 | 6.1 kG | 15.2 kOe | 9.3 MGOe | 40 mΩcm |
| 16 | 6.1 kG | 14.3 kOe | 9.2 MGOe | 45 mΩcm |
| 17 | 5.9 kG | 14.2 kOe | 8.8 MGOe | 50 mΩcm |
| 18 | 5.9 kG | 13.8 kOe | 8.7 MGOe | 60 mΩcm |
| 19 | 5.9 kG | 13.9 kOe | 8.7 MGOe | 70 mΩcm |
| 20 | 6.0 kG | 13.9 kOe | 9.0 MGOe | 80 mΩcm |

These results show that the quenched magnetic particles on which various rare earth fluoride coating films or alkaline earth metal fluoride coating films are formed, and the rare earth bonded magnets prepared with the magnetic particles have better magnetic properties and higher resistivities than the quenched magnetic particles without the coating films and the rare earth bonded magnet prepared with the quenched magnetic particles. In particular, the quenched magnetic particles on which $PrF_3$, $NdF_3$, $TbF_3$, $DyF_3$, or $HoF_3$ coating film and the rare earth bonded magnets prepared with these magnetic particles have significantly improved magnetic properties. On the other hand, the bonded magnets prepared with material magnetic particles on which other rare earth fluoride coating films or alkaline earth metal fluoride coating films are formed have improved squareness and increased maximum energy products in comparison with the bonded magnet prepared with material magnetic particles without the coating films.

As is described above, magnetic particles, sintered magnets, and bonded magnets on the surfaces of which rare earth fluoride coating films or alkaline earth metal fluorides coating films with thicknesses of 100 μm to 1 nm according to the present invention are improved in magnetic properties as compared with magnetic particles, sintered magnets, and bonded magnets without the coating films.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A treating agent for forming a rare earth fluoride coating film on a surface of an object to be treated with a coating film, wherein the rare earth fluoride is swollen in a solvent comprising a major amount of an alcohol, the treating agent is a colloidal solution in which the rare earth fluoride is dispersed homogeneously in the solvent comprising a major amount of an alcohol, and the colloidal solution, when prepared to contain the rare earth fluoride in a concentration of $1 g/dm^3$, exhibits a transmittance not less than 50% in an optical path length of 1 cm at a wavelength of 700 nm.

2. The treating agent of claim 1 wherein the solution of the rare earth fluoride gelatinizes when the solution contains the rare earth fluoride in a concentration of not less than 200 $g/dm^3$.

3. The treating agent of claim 1, wherein the alcohol is methyl alcohol, ethyl alcohol, n-propyl alcohol, or isopropyl alcohol.

4. The treating agent of claim 1, wherein the solvent comprising a major amount of an alcohol contains 50 wt% or more of at least one of methyl alcohol, ethyl alcohol, n-propyl alcohol, and isopropyl alcohol; and the solvent contains 50 wt% or less of a ketone: acetone, methyl ethyl ketone, or methyl isobutyl ketone.

5. The treating agent of claim 1, wherein the rare earth fluoride contains at least one of La, Ce, Pr, Nd, Sm, Eu, Gd, Tb, Dy, Ho, Er, Tm, Yb and Lu.

6. The treating agent of claim 1, wherein the rare earth fluoride is swollen in a solvent comprising a major amount of an alcohol, and the rare earth fluoride or the alkaline earth metal fluoride is contained in the solution or the agent in a concentration of from 0.1 $g/dm^3$ to 300 $g/dm^3$.

7. The treating agent of claim 1, wherein the agent is for treating rare magnets or a magnetic powder for rare earth magnets.

8. The treating agent of claim 1, wherein the agent is for treating NdFeB rare earth sintered magnets or a magnetic powder for NdFeB rare earth sintered magnets.

* * * * *